US010102584B1

(12) United States Patent
Devereaux et al.

(10) Patent No.: US 10,102,584 B1
(45) Date of Patent: Oct. 16, 2018

(54) STREAMLINED PROPERTY INSURANCE APPLICATION AND RENEWAL PROCESS

(71) Applicant: United Services Automobile Association, San Antonio, TX (US)

(72) Inventors: Ramsey Devereaux, San Antonio, TX (US); Mark Davis, San Antonio, TX (US); Michael J. Allen, San Antonio, TX (US); Spencer Read, Helotes, TX (US); Kathleen L. Swain, Peoria, AZ (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 14/324,748

(22) Filed: Jul. 7, 2014

Related U.S. Application Data

(60) Provisional application No. 61/948,192, filed on Mar. 5, 2014, provisional application No. 61/943,906, filed on Feb. 24, 2014, provisional application No. 61/943,901, filed on Feb. 24, 2014, provisional application No. 61/943,897, filed on Feb. 24, 2014, provisional application No. 61/926,532, filed on Jan. 13, 2014, provisional application No. 61/926,534, (Continued)

(51) Int. Cl.
*G06Q 40/08* (2012.01)
*G06K 9/00* (2006.01)

(52) U.S. Cl.
CPC ......... *G06Q 40/08* (2013.01); *G06K 9/00536* (2013.01)

(58) Field of Classification Search
CPC .............................. G06Q 50/00; G06Q 40/08
See application file for complete search history.

(56) References Cited

U.S. PATENT DOCUMENTS 5,724,261 A 3/1998 Denny
6,526,807 B1 3/2003 Doumit et al.

(Continued)

FOREIGN PATENT DOCUMENTS

WO WO 2013/036677 3/2013

OTHER PUBLICATIONS

Farmers Next Generation Homeowners Policy, Missouri, by Farmers insurance Exchange; 2008; 50 pages.

(Continued)

*Primary Examiner* — Bruce I Ebersman
(74) *Attorney, Agent, or Firm* — Fish & Richardson P.C.

(57) ABSTRACT

An insurance data gathering process contingent upon dynamically captured image and informatics sensor data. The captured image data may be used to facilitate rapid insurance-related decisions. In regards to a decision to be rendered for a property insurance policy, at least one image is retrieved associated with the property. One or more accounts associated with the insured are identified and one or more risks characteristics are identified regarding the insured. An aggregated dataset is provided from the at least one image, one or more accounts and risk characteristics associated with the insured. Predictive analysis is performed on the aggregated dataset to render a risk profile for the insured regarding an insurance policy for the property. A decision is rendered regarding the insured and the insurance policy based at least in-part upon the rendered risk profile.

9 Claims, 6 Drawing Sheets

101 102 103 104 105 106 107 108 109 142
Communication Network
100

Related U.S. Application Data filed on Jan. 13, 2014, provisional application No. 61/926,541, filed on Jan. 13, 2014, provisional application No. 61/926,536, filed on Jan. 13, 2014, provisional application No. 61/926,095, filed on Jan. 10, 2014, provisional application No. 61/926,098, filed on Jan. 10, 2014, provisional application No. 61/926,091, filed on Jan. 10, 2014, provisional application No. 61/926,093, filed on Jan. 10, 2014, provisional application No. 61/926,114, filed on Jan. 10, 2014, provisional application No. 61/926,103, filed on Jan. 10, 2014, provisional application No. 61/926,111, filed on Jan. 10, 2014, provisional application No. 61/926,108, filed on Jan. 10, 2014, provisional application No. 61/926,123, filed on Jan. 10, 2014, provisional application No. 61/926,121, filed on Jan. 10, 2014, provisional application No. 61/926,119, filed on Jan. 10, 2014, provisional application No. 61/926,118, filed on Jan. 10, 2014, provisional application No. 61/866,779, filed on Aug. 16, 2013.

(56) References Cited

U.S. PATENT DOCUMENTS 6,766,322 B1 7/2004 Bell
6,826,607 B1 11/2004 Gelvin et al.
7,398,218 B1 7/2008 Bernaski et al.
7,406,436 B1 7/2008 Reisman
7,610,210 B2 10/2009 Helitzer et al.
7,711,584 B2 5/2010 Helitzer et al.
7,716,076 B1 5/2010 Block et al.
7,809,587 B2 10/2010 Dorai et al.
7,949,548 B2 5/2011 Mathai et al.
8,004,404 B2 8/2011 Izumi et al.
8,041,636 B1 10/2011 Hunter et al.
8,086,523 B1 12/2011 Palmer
8,229,767 B2 7/2012 Birchall
8,271,303 B2 9/2012 Helitzer
8,271,321 B1 9/2012 Kestenbaum
8,289,160 B1 10/2012 Billman
8,332,242 B1 12/2012 Medina
8,400,299 B1 3/2013 Maroney et al.
8,428,972 B1 4/2013 Noles et al.
8,650,048 B1 2/2014 Hopkins, III et al.
8,676,612 B2 3/2014 Helitzer
8,731,975 B2 5/2014 English et al.
8,760,285 B2 6/2014 Billman et al.
8,774,525 B2 * 7/2014 Pershing ................ G06Q 10/06 382/100
8,788,299 B1 7/2014 Medina
8,788,301 B1 7/2014 Marlow
8,872,818 B2 10/2014 Freeman
9,141,995 B1 9/2015 Brinkmann
9,183,560 B2 11/2015 Abelow
9,252,980 B2 * 2/2016 Raman ................ H04L 12/6418
9,842,310 B2 12/2017 Lekas
2002/0032586 A1 3/2002 Joao
2002/0087364 A1 7/2002 Lerner
2002/0103622 A1 8/2002 Burge
2002/0178033 A1 11/2002 Yoshioka
2003/0040934 A1 2/2003 Skidmore
2003/0097335 A1 5/2003 Moskowitz et al.
2004/0039586 A1 2/2004 Garvey et al.
2004/0064345 A1 4/2004 Ajamian et al.
2004/0172304 A1 9/2004 Joao
2005/0050017 A1 3/2005 Ross et al.
2005/0055248 A1 3/2005 Helitzer et al.
2005/0197847 A1 9/2005 Smith
2006/0026044 A1 2/2006 Smith, II
2006/0218018 A1 9/2006 Schmitt
2006/0235611 A1 10/2006 Deaton
2007/0005400 A1 1/2007 Eggenberger
2007/0005404 A1 1/2007 Raz et al.
2007/0043803 A1 2/2007 Whitehouse et al.
2007/0088579 A1 4/2007 Richards, Jr.
2007/0118399 A1 5/2007 Avinash et al.
2007/0156463 A1 7/2007 Burton
2007/0174467 A1 7/2007 Ballou et al.
2008/0033847 A1 2/2008 McIntosh
2008/0052134 A1 2/2008 Nowak et al.
2008/0065427 A1 3/2008 Helitzer et al.
2008/0086320 A1 4/2008 Ballew et al.
2008/0154651 A1 6/2008 Kenelick et al.
2008/0154686 A1 6/2008 Vicino
2008/0164769 A1 7/2008 Eck
2008/0244329 A1 10/2008 Shinbo
2008/0306799 A1 12/2008 Sopko, III et al.
2009/0006175 A1 1/2009 Maertz
2009/0109037 A1 4/2009 Farmer
2009/0177500 A1 7/2009 Swahn
2009/0205054 A1 8/2009 Blotenberg
2009/0265193 A1 10/2009 Collins et al.
2009/0265207 A1 10/2009 Johnson
2009/0266565 A1 10/2009 Char
2009/0279734 A1 11/2009 Brown
2010/0131307 A1 5/2010 Collopy et al.
2010/0174566 A1 7/2010 Helizter et al.
2010/0241464 A1 9/2010 Amigo
2010/0274859 A1 10/2010 Bucuk
2011/0137684 A1 6/2011 Peak et al.
2011/0137685 A1 6/2011 Tracy et al.
2011/0161117 A1 6/2011 Busque et al.
2011/0295624 A1 12/2011 Chapin et al.
2011/0320226 A1 12/2011 Graziano
2012/0028635 A1 2/2012 Borg et al.
2012/0101855 A1 4/2012 Collins et al.
2012/0116820 A1 5/2012 English et al.
2012/0158436 A1 6/2012 Bauer et al.
2012/0176237 A1 7/2012 Tabe
2012/0290333 A1 11/2012 Birchall
2013/0040636 A1 2/2013 Borg et al.
2013/0060583 A1 3/2013 Collins
2013/0073303 A1 3/2013 Hsu
2013/0144658 A1 6/2013 Schnabolk
2013/0226624 A1 8/2013 Blessman et al.
2013/0245796 A1 9/2013 Lentzitzky
2013/0317732 A1 11/2013 Borg et al.
2014/0046701 A1 2/2014 Steinberg et al.
2014/0108275 A1 4/2014 Heptonstall
2014/0114693 A1 4/2014 Helitzer et al.
2014/0132409 A1 * 5/2014 Billman ................ G08B 19/00 340/539.1
2014/0136242 A1 5/2014 Weekes et al.
2014/0142989 A1 5/2014 Grosso
2014/0180723 A1 6/2014 Cote
2014/0195272 A1 7/2014 Sadiq
2014/0201315 A1 * 7/2014 Jacob ................ H04L 12/2803 709/217
2014/0257862 A1 9/2014 Billman et al.
2014/0257863 A1 9/2014 Maastricht
2014/0278573 A1 9/2014 Cook
2014/0322676 A1 10/2014 Raman
2014/0358592 A1 12/2014 Wedig et al.
2014/0380264 A1 12/2014 Misra
2015/0006206 A1 1/2015 Mdeway
2015/0221051 A1 8/2015 Settino
2015/0372832 A1 12/2015 Kortz
2016/0005130 A1 1/2016 Devereaux et al.
2016/0104250 A1 4/2016 Allen et al.
2017/0178424 A1 6/2017 Wright

OTHER PUBLICATIONS

Gonzalez Ribeiro, Ana, "Surprising things your home insurance covers," Jan. 12, 2012 in Insurance; 4 pages.
U.S. Appl. No. 14/862,776, Devereaux et al., filed Sep. 23, 2015.
U.S. Appl. No. 14/251,392, Allen et al., filed Apr. 11, 2014.
U.S. Appl. No. 14/251,377, Devereaux et al., filed Apr. 11, 2014.
U.S. Appl. No. 14/251,404, Devereaux et al., filed Apr. 11, 2014.
U.S. Appl. No. 14/251,411, Allen et al., filed Apr. 11, 2014.
U.S. Appl. No. 14/273,877, Allen et al., filed May 9, 2014.

(56) References Cited

OTHER PUBLICATIONS

U.S. Appl. No. 14/273,889, Devereaux et al., filed May 9, 2014.
U.S. Appl. No. 14/273,918, Allen et al., filed May 9, 2014.
U.S. Appl. No. 14/278,182, Allen et al., filed May 15, 2014.
U.S. Appl. No. 14/278,202, Allen et al., filed May 15, 2014.
U.S. Appl. No. 14/303,336, Devereaux et al., filed Jun. 12, 2014.
U.S. Appl. No. 14/303,347, Devereaux et al., filed Jun. 12, 2014.
U.S. Appl. No. 14/303,370, Allen et al., filed Jun. 12, 2014.
U.S. Appl. No. 14/303,382, Allen et al., filed Jun. 12, 2014.
U.S. Appl. No. 14/305,732, Devereaux et al., filed Jun. 16, 2014.
U.S. Appl. No. 14/324,534, Devereaux et al., filed Jul. 7, 2014.
U.S. Appl. No. 14/324,546, Devereaux et al., filed Jul. 7, 2014.
U.S. Appl. No. 14/324,609, Devereaux et al., filed Jul. 7, 2014.
U.S. Appl. No. 14/324,618, Devereaux et al., filed Jul. 7, 2014.
U.S. Appl. No. 14/324,759, Devereaux et al., filed Jul. 7, 2014.
U.S. Appl. No. 15/244,847, Devereaux et al., filed Aug. 23, 2016.
U.S. Appl. No. 61/866,779, Bergner, filed Aug. 16, 2013.
U.S. Appl. No. 61/926,091, Allen et al., filed Jan. 10, 2014.
U.S. Appl. No. 61/926,093, Allen et al., filed Jan. 10, 2014.
U.S. Appl. No. 61/926,095, Allen et al., filed Jan. 10, 2014.
U.S. Appl. No. 61/926,098, Allen et al., filed Jan. 10, 2014.
U.S. Appl. No. 61/926,103, Devereaux et al., filed Jan. 10, 2014.
U.S. Appl. No. 61/926,108, Allen et al., filed Jan. 10, 2014.
U.S. Appl. No. 61/926,111, Allen et al., filed Jan. 10, 2014.
U.S. Appl. No. 61/926,114, Devereaux et al., filed Jan. 10, 2014.
U.S. Appl. No. 61/926,118, Devereaux et al., filed Jan. 10, 2014.
U.S. Appl. No. 61/926,119, Devereaux et al., filed Jan. 10, 2014.
U.S. Appl. No. 61/926,121, Devereaux et al., filed Jan. 10, 2014.
U.S. Appl. No. 61/926,123, Devereaux et al., filed Jan. 10, 2014.
U.S. Appl. No. 61/926,532, Allen et al., filed Jan. 13, 2014.
U.S. Appl. No. 61/926,534, Allen et al., filed Jan. 13, 2014.
U.S. Appl. No. 61/926,536, Allen et al., filed Jan. 13, 2014.
U.S. Appl. No. 61/926,541, Allen et al., filed Jan. 13, 2014.
U.S. Appl. No. 61/943,897, Devereaux et al., filed Feb. 24, 2014.
U.S. Appl. No. 61/943,901, Devereaux et al., filed Feb. 24, 2014.
U.S. Appl. No. 61/943,906, Devereaux et al., filed Feb. 24, 2014.
U.S. Appl. No. 61/948,192, Davis et al., filed Mar. 5, 2014.
U.S. Appl. No. 62/311,491, Moy, filed Mar. 22, 2016.
U.S. Appl. No. 62/325,250, Rodgers et al., filed Apr. 20, 2016.
U.S. Appl. No. 62/351,427, Devereaux et al., filed Jun. 17, 2016.
U.S. Appl. No. 62/351,441, Flachsbart et al., filed Jun. 17, 2016.
U.S. Appl. No. 62/351,451, Chavez et al., filed Jun. 17, 2016.
Telematics Set the Stage the Improved Auto Claims Management by Sam Friedman (Oct. 10, 2012); 3 pages.
U.S. Appl. No. 14/494,207, filed Sep. 23, 2014, Campbell.
U.S. Appl. No. 14/941,225, filed Nov. 13, 2015, Billman et al.
U.S. Appl. No. 14/941,262, filed Nov. 13, 2015, Hopkins et al.
U.S. Appl. No. 14/862,776, filed Sep. 23, 2015, Devereaux et al.
U.S. Appl. No. 14/251,392, filed Apr. 11, 2014, Allen et al.
U.S. Appl. No. 14/251,377, filed Apr. 11, 2014, Devereaux et al.
U.S. Appl. No. 14/251,404, filed Apr. 11, 2014, Devereaux et at.
U.S. Appl. No. 14/251,411, filed Apr. 11, 2014, Allen et al.
U.S. Appl. No. 14/273,877, filed May 9, 2014, Allen et al.
U.S. Appl. No. 14/273,889, filed May 9, 2014, Devereaux et al.
U.S. Appl. No. 14/273,918, filed May 9, 2014, Allen et al.
U.S. Appl. No. 14/278,182, filed May 15, 2014, Allen et al.
U.S. Appl. No. 14/278,202, filed May 15, 2014, Allen et al.
U.S. Appl. No. 14/303,336, filed Jun. 12, 2014, Devereaux et al.
U.S. Appl. No. 14/303,347, filed Jun. 12, 2014, Devereaux et al.
U.S. Appl. No. 14/303,370, filed Jun. 12, 2014, Allen et al.
U.S. Appl. No. 14/303,382, filed Jun. 12, 2014, Allen et al.
U.S. Appl. No. 14/305,732, filed Jun. 16, 2014, Devereaux et al.
U.S. Appl. No. 14/324,534, filed Jul. 7, 2014, Devereaux et al.
U.S. Appl. No. 14/324,546, filed Jul. 7, 2014, Devereaux et al.
U.S. Appl. No. 14/324,609, filed Jul. 7, 2014, Devereaux et al.
U.S. Appl. No. 14/324,618, filed Jul. 7, 2014, Devereaux et al.
U.S. Appl. No. 14/324,748, filed Jul. 7, 2014, Devereaux et al.
U.S. Appl. No. 14/324,759, filed Jul. 7, 2014, Devereaux et al.
U.S. Appl. No. 14/573,981, filed Dec. 15, 2014, Allen et al.
U.S. Appl. No. 14/372,413, filed Dec. 16, 2014, Devereaux et al.
U.S. Appl. No. 15/365,555, filed Nov. 30, 2016, Devereaux et al.
U.S. Appl. No. 15/365,611, filed Nov. 30, 2016, Devereaux et al.
U.S. Appl. No. 15/365/676, filed Nov. 30, 2016, Devereaux et al.
U.S. Appl. No. 15/365,706, filed Nov. 30, 2016, Devereaux et al.
U.S. Appl. No. 15/365,721, filed Nov. 30, 2016, Devereaux et al.
U.S. Appl. No. 15/365,725, filed Nov. 30, 2016, Devereaux et al.
U.S. Appl. No. 15/365,736, filed Nov. 30, 2016, Devereaux et al.
U.S. Appl. No. 15/365,745, filed Nov. 30, 2016, Devereaux et al.
U.S. Appl. No. 15/365/754, filed Nov. 30, 2016, Devereaux et al.
U.S. Appl. No. 15/365,764, filed Nov. 30, 2016, Devereaux et al.
U.S. Appl. No. 15/365,786, filed Nov. 30, 2016, Devereaux et al.
U.S. Appl. No. 15/365,773, filed Nov. 30, 2016, Devereaux et al.
U.S. Appl. No. 15/244,847, filed Aug. 23, 2016, Devereaux et al.
U.S. Appl. No. 61/800,561, Sanidas et al., filed Mar. 15, 2013.
Zevnik, Richard. The Complete Book of Insurance. Sphinx. 2004. pp. 76-78.

* cited by examiner

STREAMLINED PROPERTY INSURANCE APPLICATION AND RENEWAL PROCESS

CROSS REFERENCE TO RELATED APPLICATIONS

This application claims priority to U.S. Patent Application Ser. Nos. 61/886,779 filed Aug. 16, 2013; 61/926,093 filed Jan. 10, 2014; 61/926,091 filed Jan. 10, 2014; 61/926,095 filed Jan. 10, 2014; 61/926,098 filed Jan. 10, 2014; 61/926,103 filed Jan. 10, 2014; 61/926,108 filed Jan. 10, 2014; 61/926,111 filed Jan. 10, 2014; 61/926,114 filed Jan. 10, 2014; 61/926,118 filed Jan. 10, 2014; 61/926,119 filed Jan. 10, 2014; 61/926,121 filed Jan. 10, 2014; 61/926,123 filed Jan. 10, 2014; 61/926,536 filed Jan. 13, 2014; 61/926,541 filed Jan. 13, 2014; 61/926,534 filed Jan. 13, 2014; 61/926,532 filed Jan. 13, 2014; 61/943,897 filed Feb. 24, 2014; 61/943,901 filed Feb. 24, 2014; 61/943,906 filed Feb. 24, 2014; and 61/948,192 filed Mar. 5, 2014 which are each incorporated herein by reference in its entirety.

FIELD OF THE INVENTION

The disclosed embodiments generally relate to a method and computerized system for designing, developing, underwriting, selling and managing insurance and related products and services, and more particularly, to aggregating and utilizing data for facilitating certain insurance actions.

BACKGROUND OF THE INVENTION

Smart house functionality is a maturing space, but the opportunity for insurance companies remains largely untapped. Thus, the terms of insurance policies, such as homeowner insurance policies, may not be reflective of the true nature of the risks being insured.

Another maturing space concerns satellite imagery. As the number of satellites increases, the more satellite imagery is becoming available to the public. As a result, satellite imagery systems or image draped systems, such as, Google Earth, are becoming more popular. Using Google Earth, a user can view satellite imagery, 3D terrain, and Geographic Information Services (GIS) data such as roads and political boundaries which can be stored in a central database. Google Earth can also display information from other public sources.

In this regard, there is utility and functionality to be provided by aggregating smart home functionality with satellite imagery and other insurance related data to facilitate rapid decision making processes.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is an improved and efficient insurance data gathering process contingent upon captured image and informatics sensor data. The captured image data may be used to facilitate rapid insurance-related decisions. In regards to a decision to be rendered regarding a property insurance policy (e.g., insurance policy renewal, obtaining a new insurance policy and receiving a quote for an insurance policy), at least one image is preferably retrieved which is associated with the property. The retrieved at least one image may be utilized for property identification purposes. One or more accounts associated with the insured (e.g., homeowner's insurance policy, automobile insurance policy, life insurance policy and investment account (401K)) are identified and one or more risks characteristics are identified regarding the insured. Preferably, the one or more risks characteristics for the insured are identified via analysis of informatic data received from one or more informatic sensor devices associated with the property. The one or more accounts may be mutually exclusive of the insurance policy to which the decision is to be rendered. An aggregated dataset is provided from the at least one image, one or more accounts and risk characteristics associated with the insured. Predictive analysis is performed on the aggregated dataset to render a risk profile for the insured regarding an insurance policy for the property. A decision is rendered regarding the insured and the insurance policy based upon the rendered risk profile.

In another aspect, retrieving the at least one image includes determining if an image associated with the property is available from a stored location (e.g., a database), and if not, an image associated with the property is obtained in real time from a camera device. Additionally, it is to be appreciated retrieving at least one image may include determining one or more risk characteristics for the property via analysis of the at least one image and may also include rendering a 3D model representative of the property from a retrieved image.

This summary section is provided to introduce a selection of concepts in a simplified form that are further described subsequently in the detailed description section. This summary section is not intended to identify key features or essential features of the claimed subject matter, nor is it intended to be used to limit the scope of the claimed subject matter.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
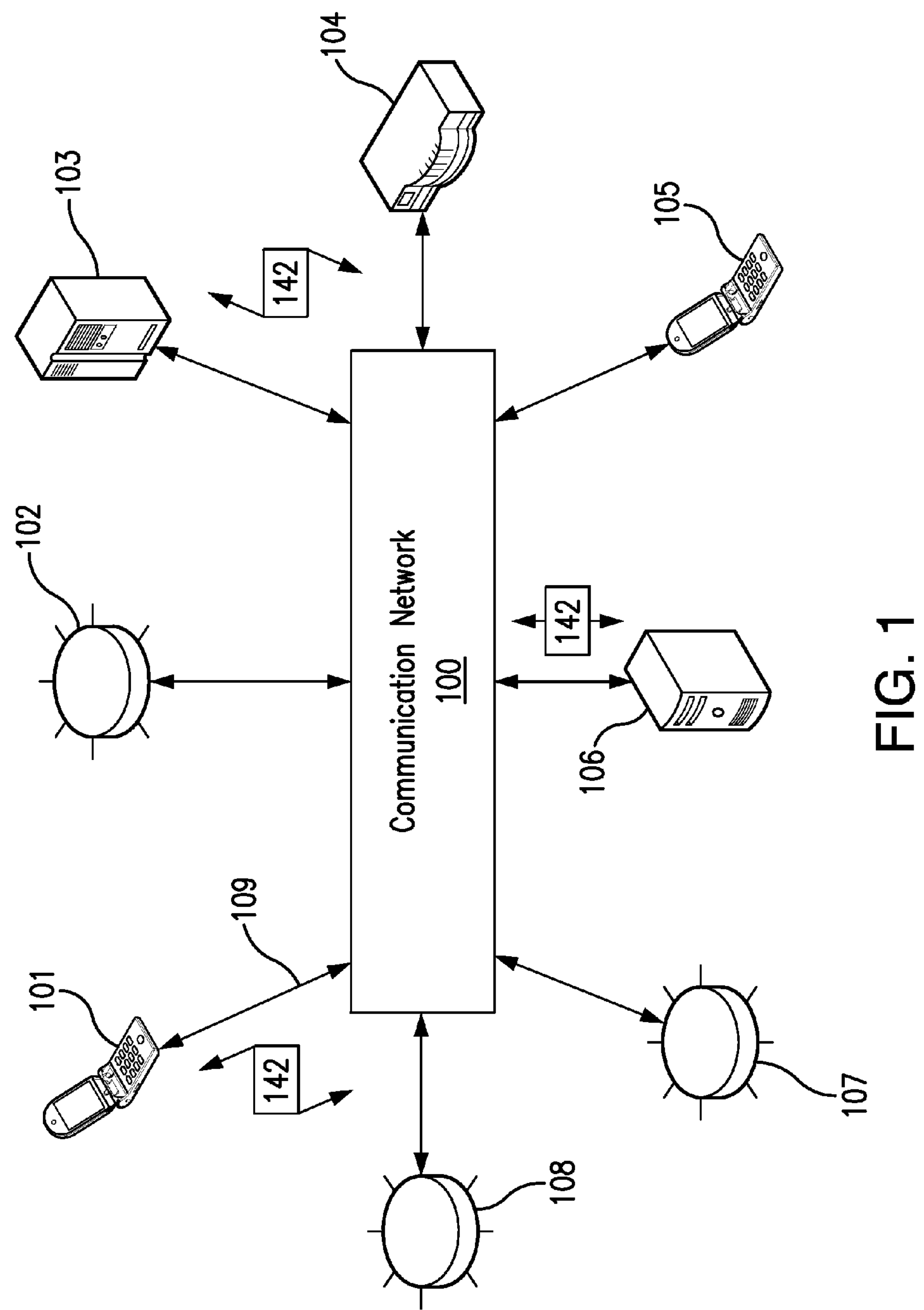
FIG. 1 illustrates an example communication network in accordance with an illustrated embodiment.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims. All publications and references cited herein are expressly incorporated herein by reference in their entirety. For instance, commonly assigned U.S. Pat. Nos. 8,289,160 and 8,400,299 are related to certain embodiments described here and are each incorporated herein by reference in their entirety. This application additionally relates to U.S. patent application Ser. No. 13/670,328 filed Nov. 6, 2012, which claims continuation priority to U.S. patent application Ser. No. 12/404,554 filed Mar. 16, 2009 which are incorporated herein by reference in their entirety.

As used herein, the term "risk related data" means data or information that may be relevant to an insurance company's decisions about underwriting, pricing, and other terms and conditions on which it is willing to issue insurance policies.

As used herein, the term "insurance policy" refers to a contract between an insurer, also known as an insurance company, and an insured, also known as a policyholder, in which the insurer agrees to indemnify the insured for specified losses, costs, or damage on specified terms and conditions in exchange of a certain premium amount paid by the insured. In a typical situation, when the insured suffers some loss for which he/she may have insurance the insured makes an insurance claim to request payment for the loss. It is to be appreciated for the purpose of the embodiments illustrated herein, the insurance policy is not to be understood to be limited to a residential or homeowners insurance policy, but can be for a commercial, umbrella, and other insurance policies known by those skilled in the art.

As also used herein, "insured" may refer to an applicant for a new insurance policy and/or may refer to an insured under an existing insurance policy.

As used herein, the term "insurance policy" may encompass a warranty or other contract for the repair, service, or maintenance of insured property.

As used herein, "insured property" means a dwelling, other buildings or structures, personal property, or business property, as well as the premises on which these are located, some or all which may be covered by an insurance policy.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as an insured property 300 or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/devices 101-108 (e.g., sensors 102, client computing devices 103, smart phone devices 105, servers 106, routers 107, switches 108 and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
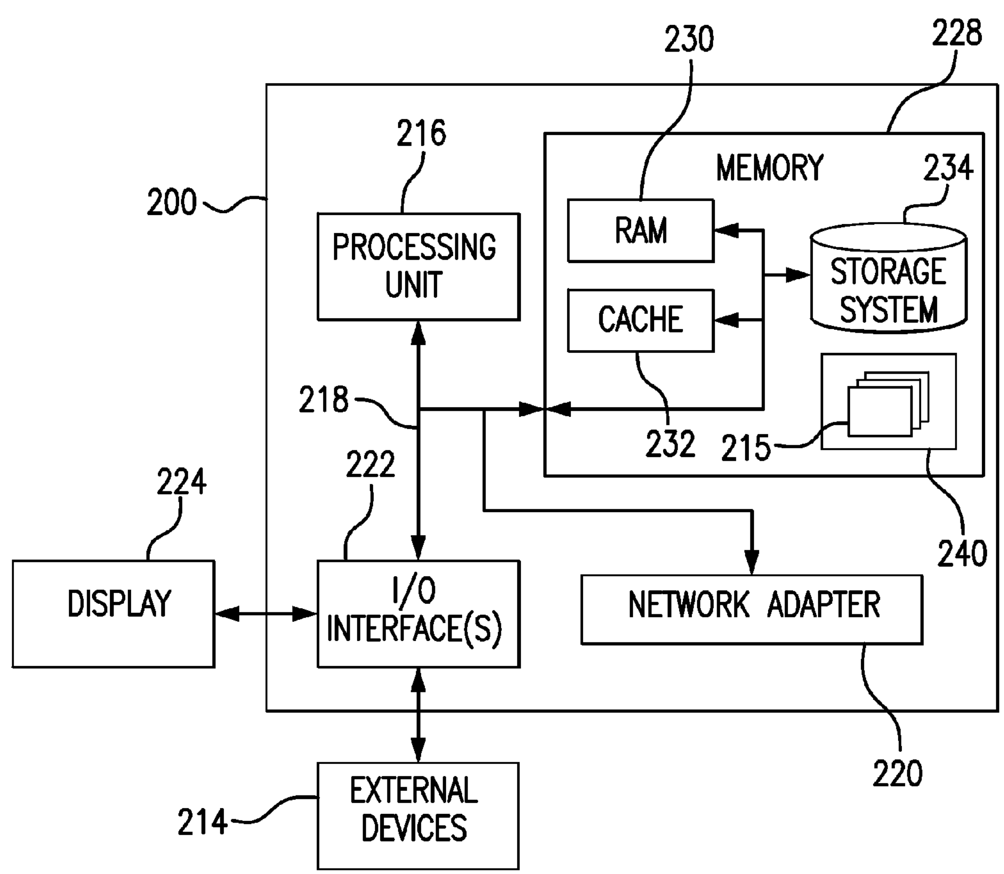
FIG. 2 illustrates a network computer device/node in accordance with an illustrated embodiment.

FIG. 2 is a schematic block diagram of an example network computing device 200 (e.g., one of network devices 101-108) that may be used (or components thereof) with one or more embodiments described herein, e.g., as one of the nodes shown in the network 100. As explained above, in different embodiments these various devices are configured to communicate with each other in any suitable way, such as, for example, via communication network 100.

Device 200 is only one example of a suitable system and is not intended to suggest any limitation as to the scope of use or functionality of embodiments of the invention described herein. Regardless, computing device 200 is capable of being implemented and/or performing any of the functionality set forth herein.

Computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

Device 200 is shown in FIG. 2 in the form of a general-purpose computing device. The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 215, such as policy manager module 306 described below, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Figure 3:
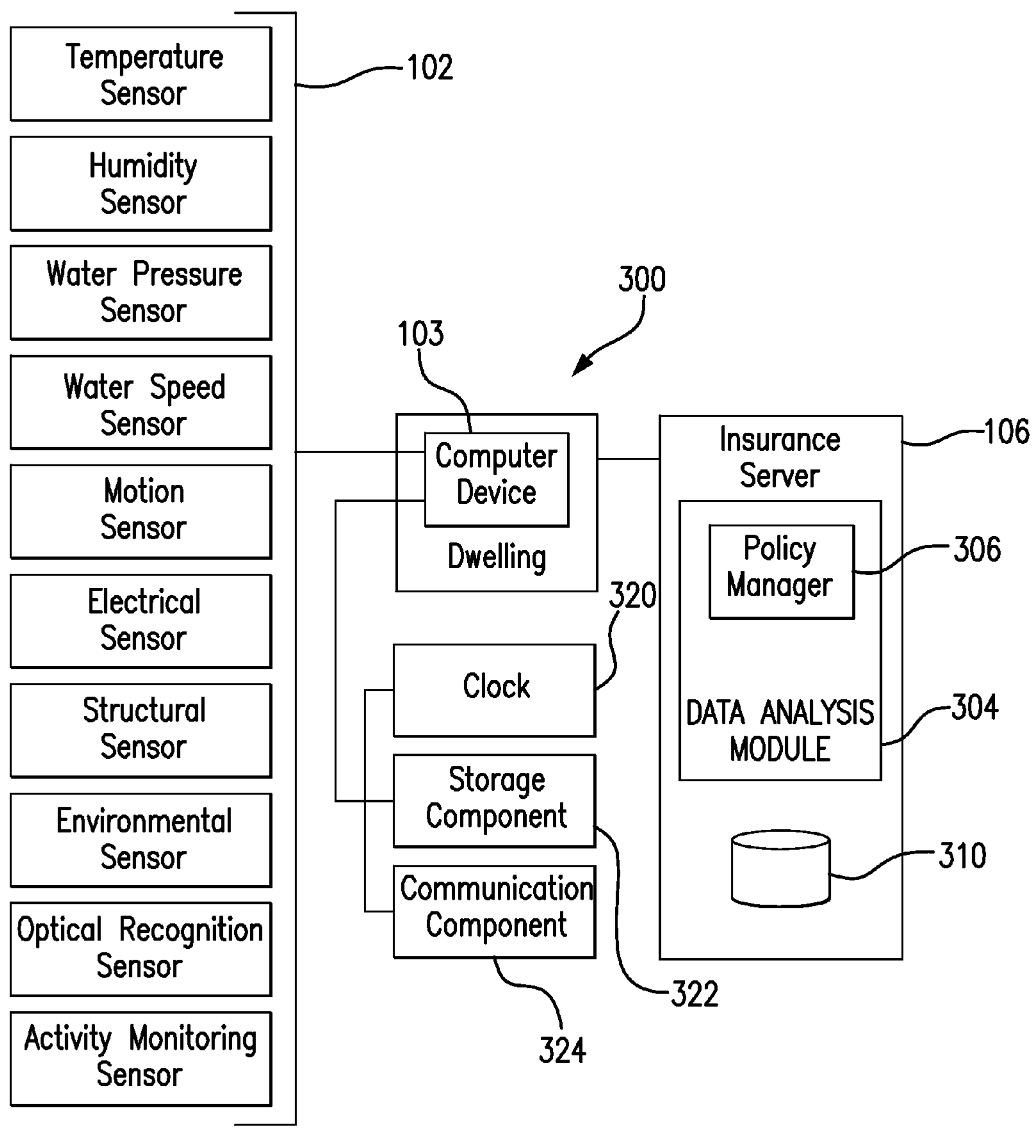
FIG. 3 is a block diagram of an insured property from which sensor data is captured for subsequent analysis in accordance with an illustrated embodiment.

With the exemplary communication network 100 (FIG. 1) and computing device 200 (FIG. 2) being generally shown and discussed above, description of certain illustrated embodiments of the present invention will now be provided. With reference now to FIG. 3, an example of an insured property 300 is shown which is to be understood to be any type of structure (e.g., residential, commercial, retail, municipal, etc.) in which the capture, aggregation and analysis of various data is useful for the reasons at least described below. Insured property 300 preferably includes a computing device 103 for capturing data from a plurality of sensors 102 which capture data regarding various aspects of insured property 300, as further described below. It is to be understood computing device 103 may be located in any location, and its position is not limited to the example shown.

Computing device 103 is preferably configured and operational to receive (capture) data from various data sources, including various sensors 102, regarding certain aspects (including functional and operational) of insured property 300 (described further below) and transmit that captured data to a remote server 106, via network 100. It is noted device 103 may perform analytics regarding the captured sensor data regarding insured property 300 and/or the remote server 106, preferably controlled by an insurance company/carrier, may perform such analytics, as also further described below. It is also to be understood in other embodiments, data from sensors 102 may be transmitted directly to remote server 106, via network 100, thus either obviating the need for computing device 103 or mitigating its functionality to capture all data from sensors 102.

In the illustrated embodiment of FIG. 3, computing device 103 is shown coupled to various below described sensor types 102. Although various sensor types 102 are described below and shown in FIG. 3, the sensor types described and shown herein are not intended to be exhaustive as embodiments of the present invention may encompass any type of known or unknown sensor type which facilitates the purposes and objectives of the certain illustrated embodiments described herein. It is to be understood and appreciated, in accordance with the embodiments herein, sensors/cameras 102 are preferably installed, and data is collected from various sources, maintained, accessed and otherwise utilized pursuant to the permission of the insured(s) and subject to appropriate security and privacy protections. Exemplary sensor types include (but are not limited to):

Temperature sensor—configured and operational to preferably detect the temperature present at the insured property 300. For example, the temperature may rise and fall with the change of seasons and/or the time of day. Moreover, in the event of a fire, the temperature present at the insured property 300 may rise quickly—possibly to a level of extreme high heat. The temperature sensor may make use of probes placed at various locations in and around the insured property 300, in order to collect a representative profile of the temperature present at the insured property 300. These probes may be connected to device 103 by wire, or by a wireless technology. For example, if device 103 is positioned in the attic of the insured property 300, the temperature may be higher than the general temperature present in the insured property. Thus, probes placed at various locations (e.g., in the basement, on the various levels of a multi-level insured property 300, in different rooms that receive different amounts of sun, etc.), in order to obtain an accurate picture of the temperature present at the insured property. Moreover, device 103 may record both the indoor and outdoor temperature present at the insured property 300. For example, data about the indoor temperature, the outdoor temperature, and/or the differential between indoor and outdoor temperatures, may be used as part of some analysis model, and thus all of the different values could be stored. Device 103 may store an abstract representation of temperature (e.g., the average indoor temperature, as collected at all of the probes), or may store each temperature reading individually so that the individual readings may be provided as input to an analysis model.

Humidity sensor—configured and operational to preferably detect the humidity present at the insured property 300. Humidity sensor may comprise the humidity-detection hardware, or may employ one or more remote probes, which may be located inside and/or outside the insured property 300. Humidity readings from one or more locations inside and/or outside the insured property could thus be recorded by device 103.

Water Sensor(s)/Water pressure sensor(s)—configured and operational to preferably monitor water related conditions, including (but not limited to): the detection of water and water pressure detection, for instance in the plumbing system in the insured property 300. With regards to a water pressure sensor, it may have one or more probes attached to various locations of the insured property's 300 plumbing, and thus device 103 may record the pressure present in the plumbing, and/or any changes in that pressure. For example, plumbing systems may be designed to withstand a certain amount of pressure, and if the pressure rises above that amount, the plumbing system may be at risk for leaking, bursting, or other failure. Thus, device 103 may record the water pressure (and water flow) that is present in the plumbing system at various points in time.

Water flow sensor—configured and operational to preferably monitor water flow rate in the plumbing system in the insured property 300. Water flow sensor may have one or more probes attached to various locations of the insured property's 300 plumbing, such as faucets, showerheads and appliances, and thus water flow sensor 103 may measure and/or record the amount of water flowing through the insured property's 300 water supply system. Thus, device 103 may record the water flow that is present in the plumbing system at various points in time.

Wind speed sensor—configured and operational to record the wind speed present at the insured property 300. For example, one or more wind sensors may be placed outside the insured property 300, at the wind speed and/or direction may be recorded at various points in time. Device 103 may record these wind speed and/or wind direction readings. The wind speed may be used by an analysis model for various purposes.

Motion sensor—configured and operational to sense motion in the insured property 300 to which device 300 is attached. Typically, insured property's 300 do not move significantly, except in the event of a catastrophe. Motion sensor may indicate that the insured property 300 is sliding down a hill (e.g., in the event of an extreme flood or mudslide), or is experiencing a measurable earthquake. A motion sensor may further include earth sensors for detecting sink holes and earth movement. In addition, a motion sensor may be configured and operational to sense the motion of objects within the insured property.

Optical (e.g., Camera/Imaging) sensor-configured and operational to allow viewing of the interior or exterior of the insured property 300 on which device 300 is attached or located. This sensor may be configured to allow access during certain triggered events. This may also include pre and post images of any event that would trigger systematic change detection that is able to compare, contrast and extrapolate differences in images.

Electrical system sensor/analyzer configured and operational to assess the condition of the insured property's 300 electrical system. For example, potentiometers may be connected to various points in the insured property's 300 electrical system to measure voltage. Readings from the potentiometers could be used to determine if the voltage is persistently too high, or too low, or if the voltage frequently drops and/or spikes. Such conditions may suggest that the insured property 300 is at risk for fire. Other types of electrical measurements could be taken, such as readings of current flowing through the electrical system. Still other types of electrical measurements could be determined include how energy is used and at what times of day it is used, etc. Any type of data about the insured property's 300 electrical system could be captured by device 103. An analysis model could use the information about electrical energy in various ways.

Positional sensor configured and operational to record the position of device 103. For example, the positional sensor may be, or may comprise, a Global Positioning System (GPS) receiver, which may allow the position of device 103 to be determined. Or, as another example, positional sensor may use triangulation technology that communicates with fixed points (such as wireless communication towers) to determine its position. While as insured property 300 normally does not move, positional sensor may allow device 103 to be recovered in the event of a catastrophe. For example, if as insured property 300 explodes, or is otherwise catastrophically damaged, device 103 may be propelled to an unknown location. Positional sensor may indicate the geographical area of as insured property 300 which an analysis model could use in various ways. Positional sensor may record the position of device 103, which device 103 could communicate to an external source, thereby allowing device 103 to be found.

Structural sensor—configured and operational to preferably detect various structural conditions relating to insured property 300. A structural sensor may comprise detection hardware, or may employ one or more remote probes, which may be located inside and/or outside the insured property 300. Conditions recorded by structural sensor may include (but are not limited to) the condition of the wall structure, floor structure, ceiling structure and roof structure of insured property 300, which may be achieved via: load bearing detectors; components which measure the slope of a floor/wall/ceiling; carpet conditions (e.g., via nano sensor) or any another components functional to detect such conditions. Structural readings from one or more locations inside and/or outside the insured property 300 could thus be recorded by device 103 and used by an analysis model in various ways.

Environmental Sensor—configured and operational to preferably detect various environmental conditions relating to insured property 300. An environmental sensor may comprise detection hardware, or may employ one or more remote probes, which may be located inside and/or outside the insured property 300. Conditions recorded by an environmental sensor may include (but are not limited to) the air quality present in insured property 300, the presence of mold/bacteria/algae/lead paint or any contaminant adverse to human health (whether airborne or attached to a portion of the structure of insured property 300). Such environmental readings from one or more locations inside and/or outside the insured property 300 could thus be recorded by device 103 and used by an analysis model in various ways.

Appliance Sensor—configured and operational to preferably detect various operating parameters relating to appliances within as insured property 300. Examples of appliances include (but are not limited to) all kitchen appliances (e.g., refrigerator, freezer, stove, cooktop, oven, grill, dishwasher, etc.); HVAC components (air conditioner, heating system, air handlers, humidifiers/de-humidifiers, etc.), water purification system, media entertainment system (e.g., televisions), networking components (routers, switches, extenders, etc) electrical generator system, pool filtration and heating system, sump pump and water well system, septic tank system, etc. An appliance sensor may comprise detection hardware, or may employ one or more remote probes, which may be located inside and/or outside the insured property 300 functional to detect certain operating parameters of appliances. Operating parameters detected by an appliance sensor 300 may include (but are not limited to): the operating efficiency of an appliance (energy usage, output performance); the time an appliance operates, the age of an appliance; maintenance needs of an appliance (e.g., change a filter component or schedule a periodic examination/tune-up); and repair needs of an appliance (which may also include the identification of parts needed). Such appliance readings from one or more insured property appliances could thus be recorded by device 203 and used by an analysis model in various ways.

With exemplary sensors 102 identified and briefly described above, and as will be further discussed below, it is to be generally understood sensors 102 preferably record certain data parameters relating to products and services provided by an insurance carrier, such as USAA, to facilitate rapid decision making process as described below. It is to be understood and appreciated the aforementioned sensors 102 may be configured as wired and wireless types integrated in a networked environment (e.g., WAN, LAN, WiFi, 802.11X, 3G, LTE, etc.), which may also have an associated IP address. It is to be further appreciated the sensors 102 may consist of internal sensors located within the structure of insured property 300; external sensors located external of the structure of insured property 300; sound sensors for detecting ambient noise (e.g., for detecting termite and rodent activity, glass breakage, intruders, etc.). It is additionally to be understood and appreciated that sensors 102 can be networked into a central computer hub (e.g., device 103) in an insured property to aggregate collected sensor data packets. Aggregated data packets can be analyzed in either a computer system (e.g., device 103) or via an external computer environment (e.g., server 106). Additionally, it is to be understood data packets collected from sensors 102 can be aggregated in computing device 103 and sent as an aggregated packet to server 106 for subsequent analysis whereby data packets may be transmitted at prescribed time intervals (e.g., a benefit is to reduce cellular charges in that some insured properties 300 may not have Internet access or cellular service is backup when Internet service is nonfunctioning).

In accordance with an illustrated embodiment, in addition to the aforementioned, the sensors 102 being utilized relative to insured property 300, computing device 103 may additionally be coupled to a Clock 320 which may keep track of time for device 103, thereby allowing a given item of data to be associated with the time at which the data was captured. For example, device 103 may recurrently detect various environmental conditions relating to insured property 300, recurrently obtain captured images of various portions of the structure of insured property 300, etc., and may timestamp each reading and each image. The time at which the readings are taken may be used to reconstruct events or for other analytic purposes, such as those described below. For example, the timestamps on roof images associated with the insured property 300 may be indicative of a roof condition at different moments in time.

A storage component 322 may further be provided and utilized to store data readings and/or timestamps in device 103. For example, storage component 322 may comprise, or may otherwise make use of, magnetic or optical disks, volatile random-access memory, non-volatile random—access memory or any other type of storage device. There may be sufficient data storage capacity to store several days or several weeks worth of readings.

A communication component 324 may further be provided and utilized to communicate recorded information from computing device 103 to an external location, such as computer server 106, which may be associated with an insurance carrier such as USAA. Communication component 324 may be, or may comprise, a network communication card such as an Ethernet card, a WiFi card, or any other communication mechanism. However, communication component 324 could take any form and is not limited to these examples. Communication component 324 might encrypt data that it communicates, in order to protect the security and/or privacy of the data. Communication component 324 may communicate data recorded by device 103 (e.g., data stored in storage component 322) to an external location, such as server 106. For example, server 106 may be operated by an insurance company, and may collect data from computing device 103 to learn about risks, repair needs and other analytics related to insured property 300 in which device 103 is located. Communication component 324 may initiate communication sessions with server 106. Or, as another example, server 106 may contact device 103, through communication component 324, in order to receive data that has been stored by device 103. Additionally, data from sensors 102, other data sources (shown in FIG. 4), clock 320 and/or storage component 322 may be communicated directly to server 106, via network 100, thus obviating or mitigating the need for computing device 103.

In the example of FIG. 3, communication component 324 (which is shown, in FIG. 3, as being part of, or used by, computing device 103) communicates data to server 106. Server 106 may comprise, or otherwise may cooperate with, a data analysis module 304, which may analyze data in some manner. Data analysis module 304 may comprise various types of sub-modules, such as policy manager 306. In general, policy manager 306 may perform an analysis of aggregated data regarding various attributes of insured property 300, such as, for example, but not limited to, structural condition of the insured property 300 and environmental conditions detected in the vicinity of the insured property 300. In another aspect, policy manager 306 may be also configured and operable to streamline the end-to-end process (from quote to claim) of insuring users and/or to facilitate other processes related to an insurance profile of a policyholder associated with insured property 300. Server 106 may further comprise, or otherwise may cooperate with, a data repository 310, which may store captured informatics sensor data and obtained image information.

Figure 4:
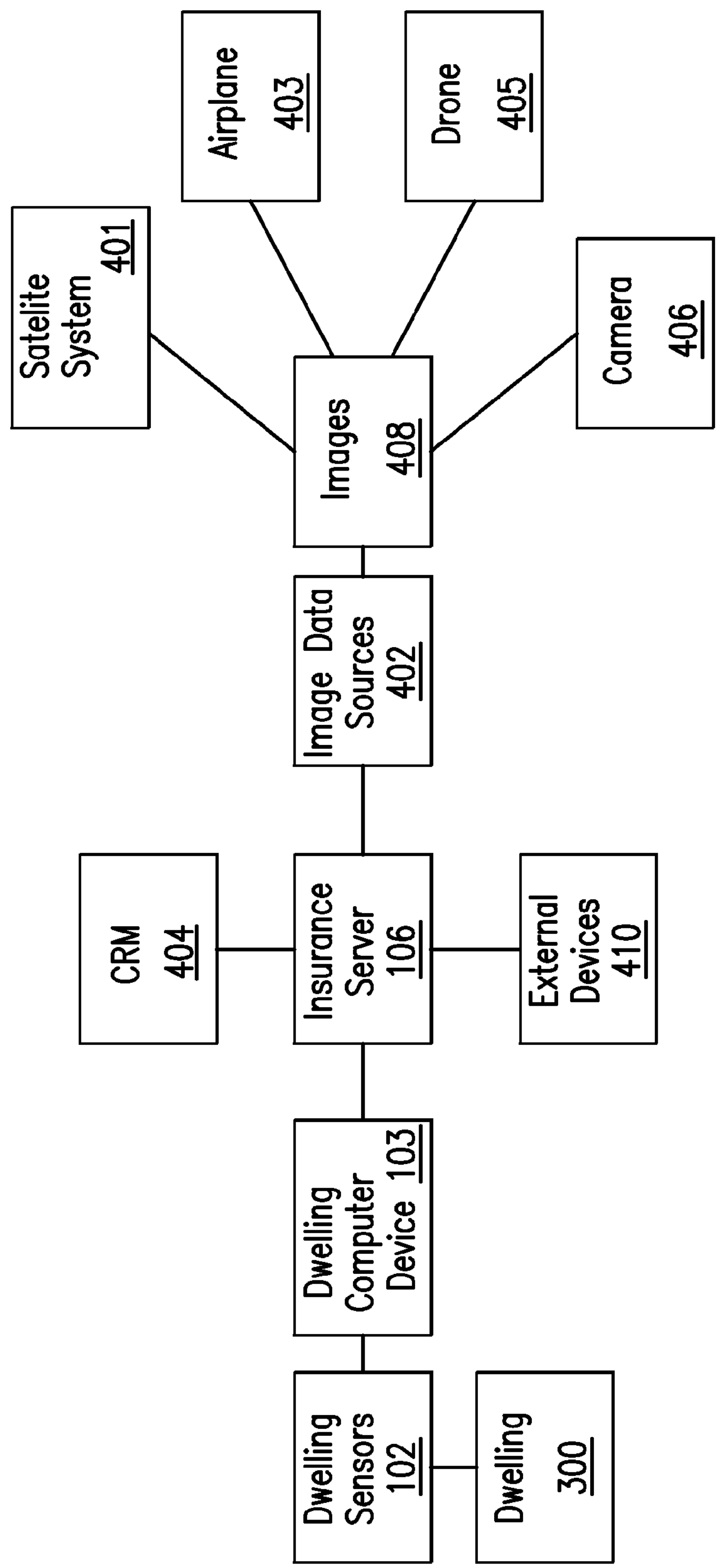
FIG. 4 is a system level diagram illustrating aggregation of data from a plurality of data sources for providing automated property insurance-related processes in accordance with an illustrated embodiment.

With reference now to FIG. 4, shown is insurance server 106 coupled to computing device 103 for receiving data from sensors 102 preferably relating to an insured property 300 in accordance with the above description. In addition to being coupled to computing device 103, insurance server 106 is also shown coupled to various image data sources 402, external computing devices/servers 410 and an insurance company's Customer Relationship Management (CRM) tool/module 404. Network 100, and links 105 thereof (FIG. 1), preferably couple server 106 to each of the aforementioned components (e.g., computing device 103, CRM module 404, image data sources 402 and external computing devices 410).

With respect to image data sources 402, they are preferably operatively coupled to one or more instruments for receiving image data/information 408 associated with the insured property 300. Modern techniques for locating one or more positions relative to objects of interest typically involve instruments that are used for surveying, geographical information systems data collection, or geospatial data collection. For example, Global Navigation Satellite System (GNSS) receivers are often used in conjunction with the surveying and geospatial instruments in order to speed position determination. Digital cameras 406, video cameras 406, multimedia devices, etc. may also be used for surveying purposes. The confluence of these systems/devices produces a variety of image data 408 that may be contained in one or more image data sources 402, such as an image-based georeferencing system, an image database, an image database management system, among others.

According to an embodiment of the present invention, the image data sources 402 may contain various views of the insured property 300. There are two principal kinds of "views" described herein: elevation view and aerial view. Elevation view in its strict definition means an orthographic rectified representation of a structure, such as insured property 300, usually as viewed from ground level. Camera images/photographs not yet rectified for orthographic presentation and not strictly elevation views, but instead are referred to herein as 'facade views.' Aerial views are images taken from above the objects of interest (i.e., insured property 300), often from airplanes 403, drones 405 or satellites 401, and themselves may be rectified or otherwise rendered to become orthographic. However, many image databases show them without such rectification, thus often showing the elevation/facades of buildings in a foreshortened view. It is appreciated that a plan view such as from a blueprint or engineering drawing also falls into the category of aerial views as described herein. It is to be understood and appreciated, one or more image data sources 402 provide image data related to the insured property 300 to be aggregated by insurance server 106 as discussed further below.

With regards to external computing devices 410, each is preferably associated with a service provider relating to an insured property. For instance, they may include (but are not limited to) emergency responders (e.g., police, fire, medical, alarm monitoring services, etc.), utility companies (e.g., power, cable (phone, internet, television), water), service providers (e.g., home appliance providers), information/news providers (e.g., weather reports and other news items) and other like service/information/data providers.

With continuing reference to FIG. 4, in an illustrated embodiment, an insurance company's CRM module 404, coupled to insurance server 106, may be operative to enable the insurance company to understand a policyholder better. For instance, the CRM tool 404 may be operative to determine if the policyholder has a homeowner's policy, a checking account, a life insurance policy and an investment device. If this policyholder has multiple lines of business with the insurance company, the data analysis module 304 may determine the risk profile to be lower than another policyholder with a homeowner's policy only. Additionally, the CRM module 404 may be operative to determine the payment history for the policyholder. This information may be used to determine the policyholder's payment history as a data layer for making rating, acceptability, and/or coverage decisions, among others.

Figure 5:
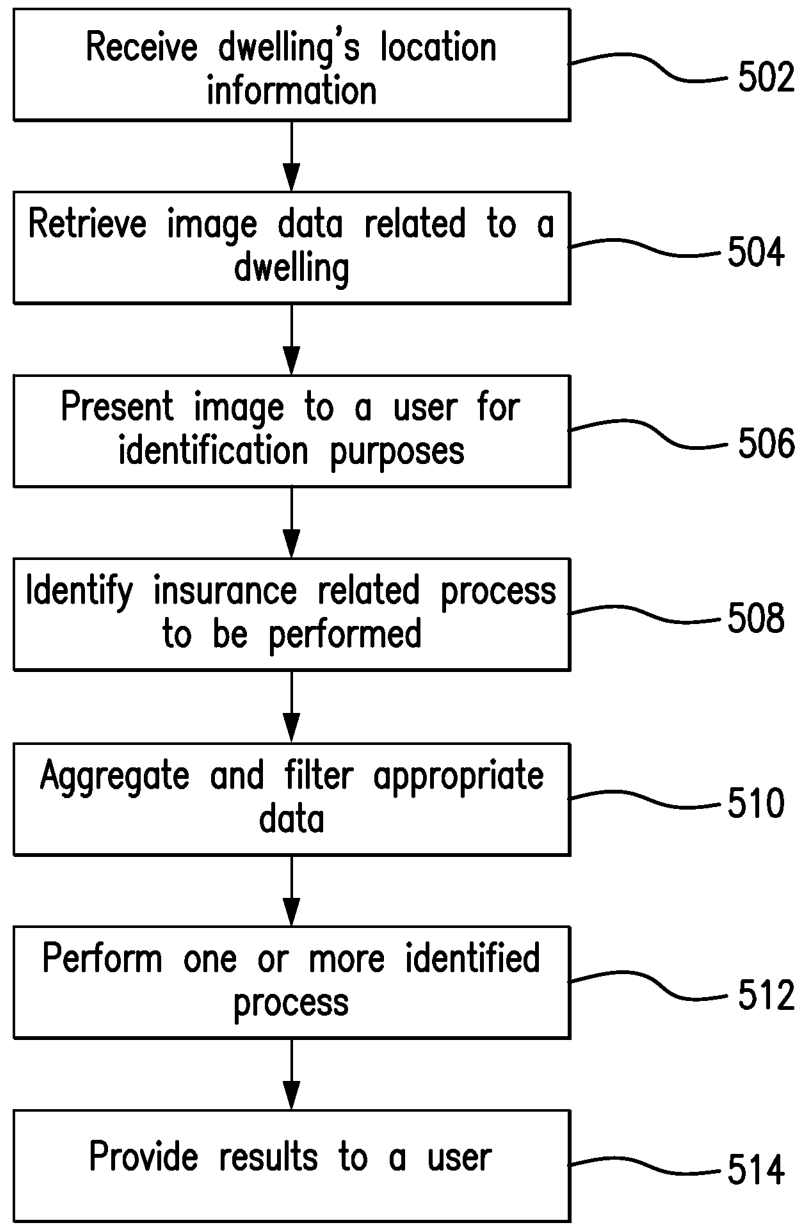
FIG. 5 is a flow diagram of operational steps of the policy manager module of FIG. 3 in accordance with an illustrated embodiment.

FIG. 5 shows, in the form of a flow chart, exemplary operational steps of the policy manager 306. Before turning to descriptions of FIG. 5, it is noted that the flow diagram shown therein is described, by way of example, with reference to components shown in FIGS. 1-4, although these operational steps may be carried out in any system and are not limited to the scenario shown in the aforementioned figures. Additionally, the flow diagram in FIG. 5 shows examples in which operational steps are carried out in a particular order, as indicated by the lines connecting the blocks, but the various steps shown in these diagrams can be performed in any order, or in any combination or sub-combination.

Generally, property insurance is associated with complex rating, underwriting and insurance-to-value processes, which typically require substantial data gathering activities. Typically, most of such data gathering is accomplished through a series of questions that are often answered by the customer. This manual process can be confusing and time consuming resulting in poor customer experience. Advantageously, policy manager 306 described herein may be configured to facilitate automated data gathering/aggregation from multiple sources, including image data sources 402, to streamline the end-to-end process (from quote to claim) of insuring customers. According to various embodiments of the present invention, in addition to data gathering and aggregation, policy manager 306 is preferably configured to facilitate a variety of property insurance related processes based upon the aggregated data. These processes include, but are not limited to, underwriting, rebuild cost estimation, providing a quote for an insurance policy, issuance and renewal of an insurance policy, validation of an insurance claim, and the like.

With reference to FIG. 5, at 502, policy manager 306 preferably starts a comprehensive data gathering related to a policyholder's insured property 300 by requesting a policyholder to provide the property location information. In an embodiment of the present invention, one of the service representatives associated with the insurance company and having access to the data analysis module 304 may confer with the policyholder regarding property's address or geolocation. Such a conference may be via an Internet chat session or a telephone, for example. Once, the data analysis module 304 obtains the property's address or geolocation it may pass the information to policy manager 306 via a corresponding message. In another embodiment of the present invention, policy manager 306 may receive the geolocation associated with the insured property 300 from a positional sensor attached to the insured property 300. For example, the positional sensor may be, or may comprise, a Global Positioning System (GPS) receiver, which may allow the position of insured property 300 to be determined. It should be appreciated that in some embodiments policy manager 306 may be integrated with other sub-modules within the data analysis module 304, as well as other modules (not shown in FIG. 3), such as a user interface module, that may comprise or may otherwise make use of the insurance server 106. Accordingly, the policyholder may interact with the policy manager 306 via such user interface module or via a website hosted by or otherwise maintained by the insurance company.

At 504, in response to acquiring the geographical location of the insured property 300, policy manager 306 may search the one or more image data sources 402 using a query that includes data specifying a provided geographic location. If a desired image data or image information 408 does not exist in any of the image data sources 402, policy manager 306 may send an image capture request to one or more surveying instruments, such as satellite 401, camera 406, etc., to obtain a new image of the insured property 300. It is noted that according to an embodiment of the present invention one or more views of the insured property 300 may be captured in real time. The captured views may include, but are not limited to, elevation view, aerial view and façade view of the insured property 300.

Figure 6:
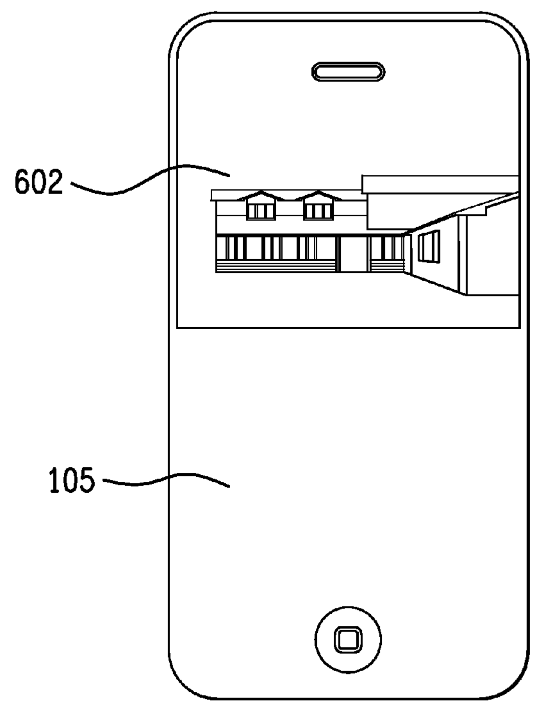
FIG. 6 illustrates policyholder's portable mobile communication device displaying an image of policyholder's insured property for visual identification purposes in accordance with an illustrated embodiment.
Figure 7A:
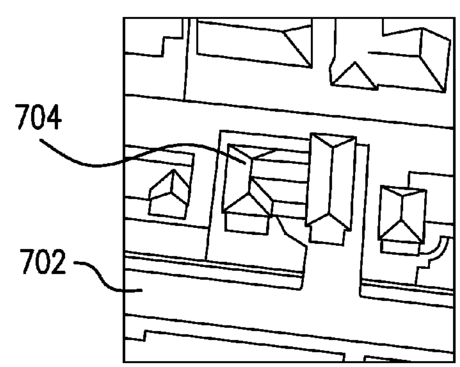
FIG. 7A illustrates an exemplary aerial image of policyholder's insured property in accordance with an illustrated embodiment.
Figure 7B:
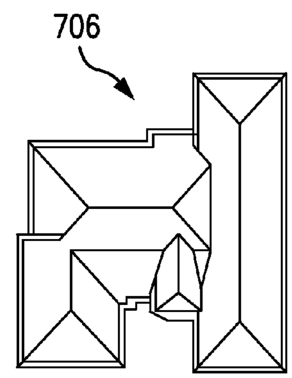
FIG. 7B illustrates an exemplary generated plan view of the roof of policyholder's insured property in accordance with an illustrated embodiment.

According to an embodiment of the present invention, if the policyholder interacts with the insurance company representative or website via a smart phone 105 or other portable device, at 506, policy manager 306 may transmit the retrieved or captured image of the insured property 300 to policyholder's device for property identification purposes. Cell phones, smart phones 105 and related portable devices typically include a display and a keypad. As shown in FIG. 6, an image 602 showing a façade view of the insured property 300 may be presented to the policyholder on the smart phone's 105 display, for example. According to another embodiment, policy manager 306 may send the image 602 to the policyholder via email, for example. By obtaining policyholder's confirmation that displayed image 602 corresponds to the policyholder's insured property 300, policy manager 306 may proceed with steps 508-514 as described below. If at 504 in addition to acquiring a façade view policy manager 306 also received one or more aerial views, such as exemplary satellite image 702 shown in FIG. 7A, policy manager 306 may be configured to process the satellite image 702, which may include a view of the insured property's roof 704. For example, the policy manger 306 may generate a plan view 706 of the roof 704, as shown in FIG. 7B. Thus, according to various embodiments of the present invention, the time-consuming and error prone data gathering process can advantageously be reduced to requesting geolocation information related to the insured property 300 from the policyholder, retrieving the corresponding image from one or more image data sources 402 and receiving policyholder's confirmation. It is noted that while the above description is directed to a case in which policy manager 306 utilizes a property image 602 for property identification purposes, the present invention is not so limited and other means of property identification are contemplated by various embodiments.

Another embodiment at 504 includes taking the aerial imagery from images 408 and using the imagery for gathering useful insurance information about the insured property 300. For example, and for explanatory purpose only, the airplane 405 can take high resolution photos of the insured property 300. Algorithms can render those images into 3D models of the home, use object recognition software to identify exterior construction, roof type, number of windows, and other features of the property. These features can be pulled into a tool that will estimate the amount of insurance needed on the property.

Another embodiment is that risk characteristics can also be identified by the images collected. For example, the images 408 can identify that insured property 300 has a tree touching the roof of the insured property. When a tree touches the roof it can cause the roof to wear out quicker. An alert can be sent to the insurance company, the insured, or a 3$^{rd}$ party if a risk like this is identified. Risk characteristics like this can be used for underwriting, pricing, and acceptability of the homeowner policy.

With reference back to FIG. 5, at 508, policy manager 306 preferably identifies one or more insurance related processes to be performed via further interaction with the policyholder. For example, this step may involve a determination whether the policyholder is interested in renewing an existing policy, getting a new policy or just obtaining a quote for a new insurance policy covering insured property 300. Once determined, policy manager 306 may proceed to step 510.

At 510, policy manager 306 may collect various data related to the insured property 300 and/or policyholder. As a non-limiting example, the CRM tool 404 operatively interconnected with policy manager 306 may be operative to provide additional information about the policyholder. For instance, the CRM tool 404 may be operative to determine whether the policyholder has a homeowner's policy, a checking account, a life insurance policy and an investment device. If the policyholder has multiple lines of business with the insurance company, it may be determined that the risk profile may be lower than another policyholder with a homeowners policy only. Additionally, the CRM may be operative to determine the payment history for the policyholder. This information may be used to determine the policyholder's payment history as a data layer for making rating, acceptability, and/or coverage decisions.

With continuing reference to the aggregating of data in step 510, in an embodiment of the present invention, policy manager 306 preferably collects data related to a policyholder's surrounding risk characteristics. These risk characteristics can be data layers about the policyholder's risk in the area the policyholder lives. Examples of the risks that can be known or determined about the insured property 300 include, but are not limited to, the hurricane risk, earthquake risk, flood risk, crime risk, wildfire risk, lightning risk, hail risk, and sinkhole risk. Various information related to these risk factors can be captured by a plurality of sensors 102 described above with reference to FIG. 3. This sensor captured data can add to the information known about the policyholder and the insured property 300 and can be useful to policy manager 306 for determining pricing, acceptability, underwriting, and policy renewal, among other property insurance related decisions.

Additionally, policy manager 306 preferably collects data related to unstructured data. Unstructured data (also called unstructured information) refers to data with no uniform structure. Unlike structured data, which is described by explicit semantic data models, unstructured data lacks such explicit semantic structure necessary for computerized interpretation. According to an embodiment of the present invention, policy manager 306 could collect unstructured data from social networks, such as Facebook and Twitter. For instance, based on the geolocation information obtained at 502, policy manager 306 may determine that the insured property 300 is situated in a wildfire prone area. Furthermore, a community in this high wildfire area may organize wildfire prevention and mitigation efforts by means of social media coordination. The policy manager 306 and/or other modules hosted by the insurance server 106 can monitor the social media sites and may know that this community is organizing and utilizing wildfire loss mitigation techniques. This data could be used by policy manager 306 along with the other aggregated information about the policyholder and/or the insured property 300 to make various types of decisions and/or enable the provision of certain products/services such as those that can be offered by an insurance carrier. Also, policy manager 306 may determine that the aforesaid wildfire community is not giving out the latest wildfire science information to the community members. Accordingly, policy manager 306 may provide to the policyholder the latest information related to wildfire science mitigation techniques.

It should be appreciated that policy manager 306 may store the captured informatics data and retrieved image data in the data repository 310 (which is shown, in FIG. 3, as being part of, or used by, insurance server 106). The data repository 310 may comprise a database or any other suitable storage component. For example, the suitable storage component may comprise, or may otherwise make use of, magnetic or optical disks, volatile random-access memory, non-volatile random—access memory or any other type of storage device.

With continuing reference to the step 510, in an embodiment of the present invention, policy manager 306 optionally selectively filters aggregated data based on the type of processes need to be performed and/or based on type of decisions need to be made. The main idea behind this aspect of the present invention is that policy manager 306 may selectively filter out any non-relevant data before sending the data to more predictive models described below, based on the context of the particular decision. In an embodiment of the present invention, data filtering feature may be implemented based on filtering rules predefined by the insurance company.

At 512, policy manager 306 preferably performs one or more processes identified at step 508 using the aggregated data in order to provide services/products desired by the policyholder. Examples of the services facilitated by policy manager 306 may include, without limitation, providing a quote for an insurance policy insuring the insured property 300, issuing a new insurance policy for the insured property 300, renewing the policyholder's property insurance policy associated with the insured property 300, validating an insurance claim associated with the insured property 300 if actual loss occurs, generating an insurance to value (ITV) estimate, and the like. In addition, prior to providing a quote, issuing and/or renewing an insurance policy, for example, policy manager 306 may conduct a rigorous underwriting process to evaluate risks associated with the insured property 300. It should be appreciated that policy manager 306 may utilize aggregated data, including image data, to perform the aforesaid processes. For instance, policy manager 306 may use one or more images provided by the one or more image data sources 402 to conduct a virtual inspection of the policyholder's insured property 300. As another example, if the policyholder is interested in initiating a hail damage claim against his/her insurance policy, policy manager 306 may evaluate an image, such as image 702 shown in FIG. 7A depicting the roof 704 of the insured property 300, to evaluate the extent of the damage, provided that the image 702 was captured after the date the hail was reported. As yet another non-limiting example, policy manager 306 may utilize image data for insurance renewal purposes. More specifically, prior to issuing a renewal policy, policy manager 306 may transmit an image capture request to one or more surveying instruments, such as satellite 401, camera 406, etc. to obtain a real-time aerial image of the insured property 300. In addition, policy manager 306 may retrieve a previously taken aerial image of the insured property 300 that may be associated, for example, with policyholder's expiring policy. By analyzing and comparing these two images policy manager 306 may be capable of determining any structural changes, structural damage, etc. related to the insured property 300. It should be appreciated that the specific examples of image data utilization that are discussed above by no means constitute an exhaustive list.

With continuing reference to the step 512, policy manager 306 preferably utilizes one or more predictive models to rapidly perform one or more insurance related process and/or to provide insurance related services identified at 508. Predictive modeling generally refers to techniques for extracting information from data to build a model that can predict an output from a given input. Predicting an output can include performing analysis to predict an occurrence of a certain peril, such as earthquake or hurricane, to name a few examples. Various types of predictive models can be used to analyze data and generate predictive outputs. Examples of predictive models include, but are not limited to, Naive Bayes classifiers, linear and logistic regression techniques, support vector machines, neural networks, memory-based reasoning techniques, and the like. Typically, a predictive model is trained with training data that includes input data and output data that mirror the form of input data that will be entered into the predictive model and the desired predictive output, respectively. The amount of training data that may be required to train a predictive model can be large. It is noted that different types of predictive models may be used by policy manager 306 depending on the type of the service/product provided and/or type of captured informatics sensor or image data.

It should be appreciated that some comprehensive insurance related decisions may be made by aggregating results provided by the one or more predictive models. For instance, to recalculate a coverage amount or a premium of the property-insurance policy, policy manager 306 may aggregate results provided by various models and available unstructured data that predict risks associated with hurricane risk, earthquake risk, flood risk, crime risk, wildfire risk, lightning risk, hail risk, sinkhole risk, and the like.

At 514, policy manager 306 preferably provides results to users via, for example, the aforementioned user interface module or website. Alternatively, policy manager 306 may store the generated results in the data repository 310.

Advantageously, policy manager 306, fully integrated with other modules and various data sources described above, provides an improved, efficient and streamlined data gathering process that is contingent upon dynamically captured image and informatics sensor data. In another aspect, policy manager 306 may also provide for "one click" process to facilitate a rapid insurance-related action. This "one click" process can quickly provide the policyholder a quote on, for example and not limited to, a homeowner or auto insurance policy. According to an illustrative embodiment of the present invention, policy manager 306 preferably aggregates and filters the information about the policyholder and/or a corresponding property using the ways illustrated above, and the policyholder either only has to provide very little or no additional information about their home or car. This can significantly expedite the quote process. For example, policy manager 306 can solicit a homeowners policy to the policyholder, the policyholder can see a picture of their home on a mobile phone (such as image 602 displayed on smart phone device 105 in FIG. 6) with all the home characteristics already provided. The policyholder would only need to select "buy" and they have purchased their home insurance.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A sensor system comprising:

a plurality of sensor devices each configured to capture data of a different attribute of a property, each sensor device having a transmitter configured to couple to a network for transmitting the captured property attribute data via the network, the plurality of sensor devices including:

a first camera device configured to capture a first digital image of an elevational view of the property;

a second camera device configured to capture a second digital image of an aerial or a facade view of the property; and a structural sensor device for capturing structural condition data relating to one or more structural conditions associated with the property;

a data storage component coupled to each of the plurality of sensors devices via the network, wherein the data storage component is configured to aggregate captured data regarding different attributes of the property received from each of the sensor devices, the captured data including the first digital image, the second digital image, and the structural condition data;

a communication component coupled to the data storage component configured to:

encrypt the aggregated captured data; and transmit the aggregated captured encrypted data via the Internet; and a computer management module coupled to the communication component, via the Internet, and programmed to:

receive the aggregated encrypted data from the communication component regarding the attributes of the property;

render a three-dimensional model representative of the property utilizing the first and second digital images captured from the first camera device and the second camera device respectively and the structural condition data captured by the structural sensor device, wherein the three-dimensional model provides visual indications of features of the property;

identify risk characteristics for the property based on a predictive analysis performed using the three-dimensional model to determine interactions between the features of the property;

transmit the three-dimensional model and the identified risk characteristics for the property to a user device for display.

2. The system as recited in claim 1, wherein the user device is a smartphone device.

3. The system as recited in claim 1, wherein the features of the property include exterior constructions features of the property.

4. The system as recited in claim 1, wherein the features of the property include roof construction features of the property.

5. The system as recited in claim 1, wherein the features of the property include indication of a number of windows associated with the property.

6. The system as recited in claim 1, wherein the features of the property include proximity indication of nature elements relative to the property.

7. The system as recited in claim 1, wherein the network coupled to the plurality of sensor devices is a Wide Area Network (WAN).

8. The system as recited in claim 1, wherein the network coupled to the plurality of sensor devices is a Cellular Network.

9. The system as recited in claim 1, wherein the communication component is configured as one of an Ethernet card or Wi-Fi card.

* * * * *